(12) United States Patent
Dodd et al.

(10) Patent No.: US 9,276,869 B2
(45) Date of Patent: Mar. 1, 2016

(54) DYNAMICALLY SELECTING AN IDENTITY PROVIDER FOR A SINGLE SIGN-ON REQUEST

(71) Applicant: International Business Machines Corporation, Armonk, NY (US)

(72) Inventors: William D. Dodd, Austin, TX (US); William J. O'Donnell, Austin, TX (US); Eduardo N. Spring, Round Rock, TX (US); Chunlong Liang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 13/732,727

(22) Filed: Jan. 2, 2013

(65) Prior Publication Data

US 2014/0189123 A1 Jul. 3, 2014

(51) Int. Cl.
*G06F 15/173* (2006.01)
*H04L 12/911* (2013.01)
*H04L 29/06* (2006.01)
*H04L 29/08* (2006.01)

(52) U.S. Cl.
CPC ............ *H04L 47/70* (2013.01); *H04L 63/0815* (2013.01); *H04L 67/02* (2013.01); *H04L 67/327* (2013.01)

(58) Field of Classification Search
CPC ...................................................... H04L 47/70
USPC .......................................................... 709/226
See application file for complete search history.

(56) References Cited

U.S. PATENT DOCUMENTS

| | | | |
|---|---|---|---|
| 8,037,194 B2 * | 10/2011 | Yared et al. | 709/229 |
| 8,141,139 B2 | 3/2012 | Hinton et al. | |
| 8,181,225 B2 | 5/2012 | Hinton et al. | |
| 2006/0021017 A1 | 1/2006 | Hinton et al. | |
| 2006/0155993 A1 * | 7/2006 | Busboon | 713/169 |
| 2012/0011578 A1 | 1/2012 | Hinton et al. | |
| 2012/0216125 A1 * | 8/2012 | Pierce | 715/744 |
| 2012/0278872 A1 * | 11/2012 | Woelfel et al. | 726/7 |
| 2013/0276085 A1 * | 10/2013 | Sharaga et al. | 726/8 |
| 2014/0068743 A1 * | 3/2014 | Marcus et al. | 726/8 |

OTHER PUBLICATIONS

Sliman et al, "Single Sign-on Integration in a Distributed Enterprise Service Bus", ESR Groups, France, 2009.
(Continued)

*Primary Examiner* — Ario Etienne
*Assistant Examiner* — Sahera Halim
(74) *Attorney, Agent, or Firm* — Joseph Petrokaitis; David H. Judson

(57) ABSTRACT

An identity provider (IdP) discovery service operative at a service provider (SP) is described. In operation, and as valid requests are received by the SP via normal IdP-initiated flows, the SP builds-up knowledge about the relationship between the IdP (that redirected the request) and the initiator of the request. The IdP instance typically is inferred from an HTTP referrer field, and information about the initiator may be ascertained from client-specific information, such as client system IP address, client DNS domain, a domain of a user e-mail address, a target URL for the incoming request, or the value associated with a particular HTTP header field. This knowledge is maintained in one or more mapping table(s) that associate request attributes-to-IdP instance data. The mappings are then used to facilitate IdP discovery for a new incoming request to the SP that has been determined to originate from other than an IdP.

21 Claims, 3 Drawing Sheets

(56) References Cited

OTHER PUBLICATIONS

"Content Metadata and Authorization Exchange Between Content Providers and Service Providers", IPCOM000207136D, May 17, 2011.
Kim et al, "Chord Based Identity Management for e-Healthcare Cloud Applications," 2010 10th Annual International Symposium on Applications and the Internet, May 2010.
IBM, "A Method & Apparatus for Dynamically Controlled Access to a Service Provider in Identity Provider System", IPCOM000173465D, Aug. 8, 2008.
"Where Are You From" (WAYF) Service, available at http://www.switch.ch/aai/support/tools/wayf.html, 2012.
Oasis, "Identity Provider Discovery Service Protocol and Profile," available at http://docs.oasis-open.org/security/saml/Post2.0/sstc-saml-idp-discovery.pdf, Mar. 27, 2008.

\* cited by examiner

DYNAMICALLY SELECTING AN IDENTITY PROVIDER FOR A SINGLE SIGN-ON REQUEST

BACKGROUND OF THE INVENTION

1. Technical Field

This disclosure relates generally to management of computing resources in a federated environment.

2. Background of the Related Art

Federated environments are known in the art. A federation is a set of distinct entities, such as enterprises, organizations, institutions, or the like, that cooperate to provide a single-sign-on, ease-of-use experience to a user. A federated environment differs from a typical single-sign-on environment in that two enterprises need not have a direct, pre-established, relationship defining how and what information to transfer about a user. Within a federated environment, entities provide services that deal with authenticating users, accepting authentication assertions (e.g., authentication tokens) that are presented by other entities, and providing some form of translation of the identity of the vouched-for user into one that is understood within the local entity. Federation eases the administrative burden on service providers. A service provider (SP) can rely on its trust relationships with respect to the federation as a whole; the service provider does not need to manage authentication information, such as user password information, because it can rely on authentication being accomplished by a user's authentication home domain, which is the domain at which the user authenticates.

In particular, a federated entity may act as a user's home domain that provides identity information and attribute information about federated users. An entity within a federated computing environment that provides identity information, identity or authentication assertions, or identity services, is termed an identity provider (IdP). Other entities or federation partners within the same federation may rely on an identity provider for primary management of a user's authentication credentials, e.g., accepting a single-sign-on (SSO) token that is provided by the user's identity provider. An identity provider is a specific type of service that provides identity information as a service to other entities within a federated computing environment.

It is also known to use a login service where SAML (Security Assertion Markup Language) security has been deployed. The SAML security model offloads user authentication to an IdP, which handles the user login. After the IdP has verified the user's identity, the IdP issues to a service provider (SP) application an identity assertion representing the authenticated user. On receipt of the identity assertion, the SP cryptographically verifies the user's assertion, and the SP may allow the user access to resources if the assertion verification is successful. As a prerequisite to verifying assertions, typically the SP is partnered with the IdP and obtains information about the IdP, including the IdP's certificate used with cryptographic operations.

A service provider may also support web-based single sign-on (SSO) with many different Identity Provider partners. In a typical use case, a user accesses a secured business application without yet being authenticated. The service provider is required to start an SSO service to authenticate the user. When multiple IdPs are available, a challenge arises in determining which identity provider is appropriate for a particular request. To address this problem, it is known in the art to provide Identity Provider discovery services and protocols, such as WAYF ("Where Are You From" service), OASIS Identity Provider discovery service, IBM® Tivoli® Federated Identity Manager (TFIM), which is a WAYF-based solution, and the like. The TFIM WAYF-based solution may be configured to automatically redirect a user to a single IdP that meets specific criteria based on the HTTP request data. U.S. Publication No. 2012/0144034, which is assigned to the assignee of this application, describes an alternative IdP discovery service that directs a user to a specific instance of an IdP based on geographic location or IdP system load.

Known identity provider discovery services that are built on WAYF or OASIS often require explicit action by the user (or other unspecified means) to select the appropriate IdP. Discovery services that are provided in commercial products (namely, IBM TFIM) provide significant advantages, but they may require administrator configuration and a deep awareness of the patterns and use cases to fully configure the correct IdP selection parameters.

BRIEF SUMMARY

This disclosure describes a method and system by which a service provider can "learn" the relationship between incoming requests and appropriate IdP instance(s) that may be used to handle those requests, and then uses that knowledge to facilitate a subsequent selection of an IdP for a new SSO request. Using this approach, a service provider builds up a mapping table of request attributes-to-IdP instances. Later, and upon receipt by the service provider of a new request that does not originate from an IdP, the SP uses the mapping table to dynamically select an IdP to respond to the request. The technique obviates administrator configuration or maintenance of large static rule sets or other routing parameters.

In general, as valid requests are received by the SP via normal IdP-initiated flows, the service provider builds-up "knowledge" about the relationship between the IdP (that redirected the request) and the initiator of the request (typically, the end user). The IdP instance typically is inferred from an HTTP referrer field (or other such means), and information about the initiator may be ascertained from client-specific information, such as client system IP address, client DNS domain, a domain of a user e-mail address, a target URL for the incoming request, or the value associated with a particular HTTP header field. In operation, the service provider maintains a database (e.g., one or more data tables) that associates the request attributes-to-IdP instance data as the IdP-initiated data flows are handled. These associations are built-up over time to form a knowledge base, which is then used to facilitate IdP discovery for a new incoming request to the SP that has been determined to originate from other than an IdP.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
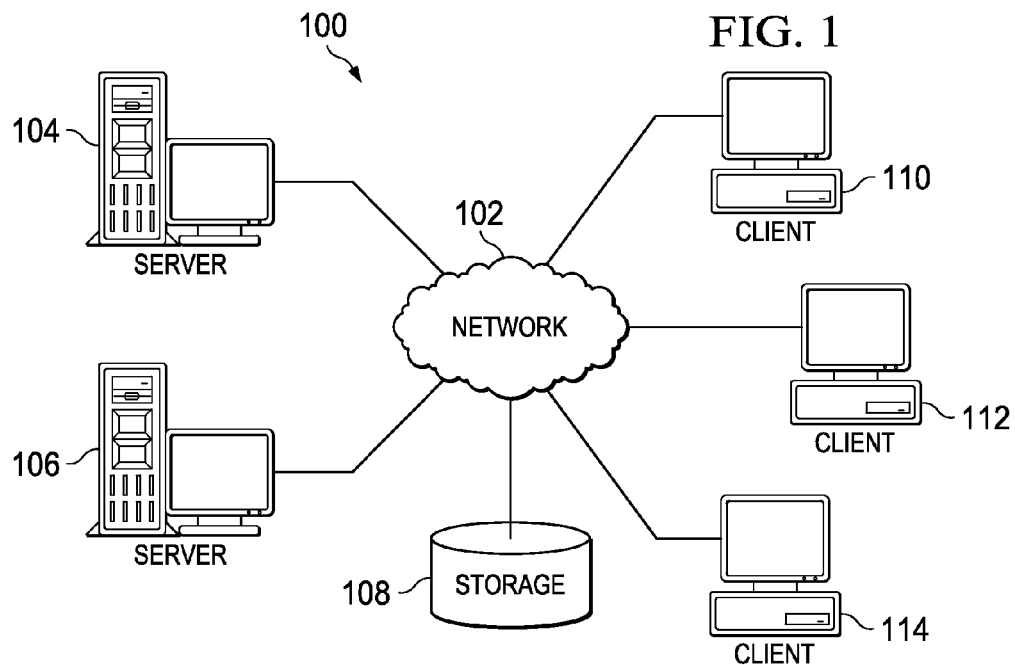
FIG. 1 depicts an exemplary block diagram of a distributed data processing environment in which exemplary aspects of the illustrative embodiments may be implemented.
Figure 2:
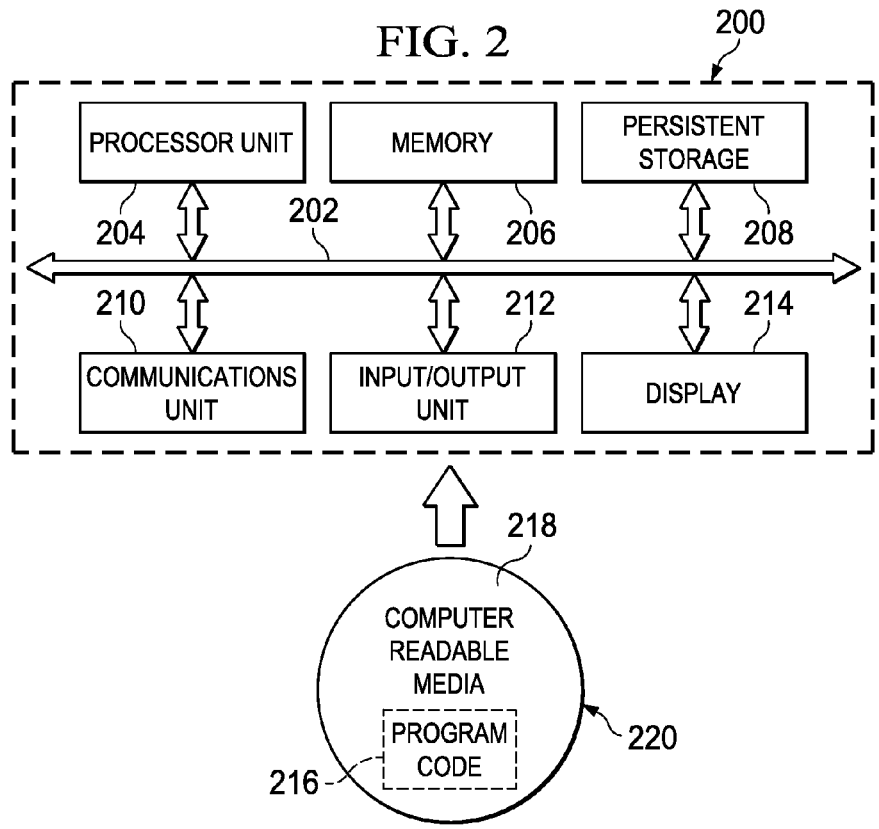
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

The Federation Model

As described above, the techniques described herein find particular utility in the context of a "federated" environment. Thus, the following background is provided. In general, an enterprise has its own user registry and maintains relationships with its own set of users. Each enterprise typically has its own means of authenticating these users. However, in a federated scheme, enterprises cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

As is well-known, a federation is a set of distinct entities, such as enterprises, logical units within an enterprise, organizations, institutions, etc., that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services which deal with authenticating users, accepting authentication assertions (e.g., authentication tokens) that are presented by other entities, and providing some form of translation of the identity of the vouched-for user into one that is understood within the local entity.

Federation eases the administrative burden on service providers. A service provider can rely on its trust relationships with respect to the federation as a whole; the service provider does not need to manage authentication information, such as user password information, because it can rely on authentication that is accomplished by a user's authentication home domain or an identity provider. A federated environment allows a user to authenticate at a first entity, which may act as an issuing party to issue an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user. Furthermore, this information can be used by a relying party to provide access to the relying party's resources, based on the relying party's access control rules, identity mapping rules, and possibly some user attributes that are maintained by the relying party.

An identity provider (IdP) is a specific type of service that provides identity information as a service to other entities within a federated computing environment. With respect to most federated transactions, an issuing party for an authentication assertion would usually be an identity provider; any other entity can be distinguished from the identity provider. Any other entity that provides a service within the federated computing environment can be categorized as a service provider. Once a user has authenticated to the identity provider, other entities or enterprises in the federation may be regarded as merely service providers for the duration of a given federated session or a given federated transaction.

Although it may be possible that there could be multiple enterprises within a federated environment that may act as identity providers, e.g., because there may be multiple enterprises that have the ability to generate and validate a user's authentication credentials, etc., a federated transaction usually involves only a single identity provider. If there is only a single federated entity that is able to authenticate a user, e.g., because there is one and only one entity within the federation with which the user has performed a federated enrollment or registration operation, then it would be expected that this entity would act as the user's identity provider in order to support the user's transactions throughout the federated environment.

As additional background, Security Assertion Markup Language (SAML) is an XML-based standard for exchanging authentication and authorization data between security domains, that is, between an identity provider (a producer of assertions) and a service provider (a consumer of assertions). SAML is a development of the OASIS Security Services Technical Committee. SAML implements the concepts of Identity Providers (source of assertions), and Service Providers (consumers of assertions). The Service Provider (SP) trusts the Identity Provider (IdP) to authenticate the principal. SAML assumes the principal (often a user) has enrolled with at least one identity provider. This identity provider is expected to provide local authentication services to the principal. SAML, however, does not specify the implementation of these local services; indeed, SAML does not care how local authentication services are implemented (although individual service providers do). Thus, a service provider relies on the identity provider to identify the principal. At the principal's request, the identity provider passes a SAML assertion to the service provider. On the basis of this assertion, the service provider makes an access control decision. To facilitate SAML, a trusted partnership may be set up that comprises IdPs and SPs exchanging metadata about each other's SAML implementation, including keys to encrypt/decrypt the SAML assertions.

The Cloud Computing Model

By way of additional background, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
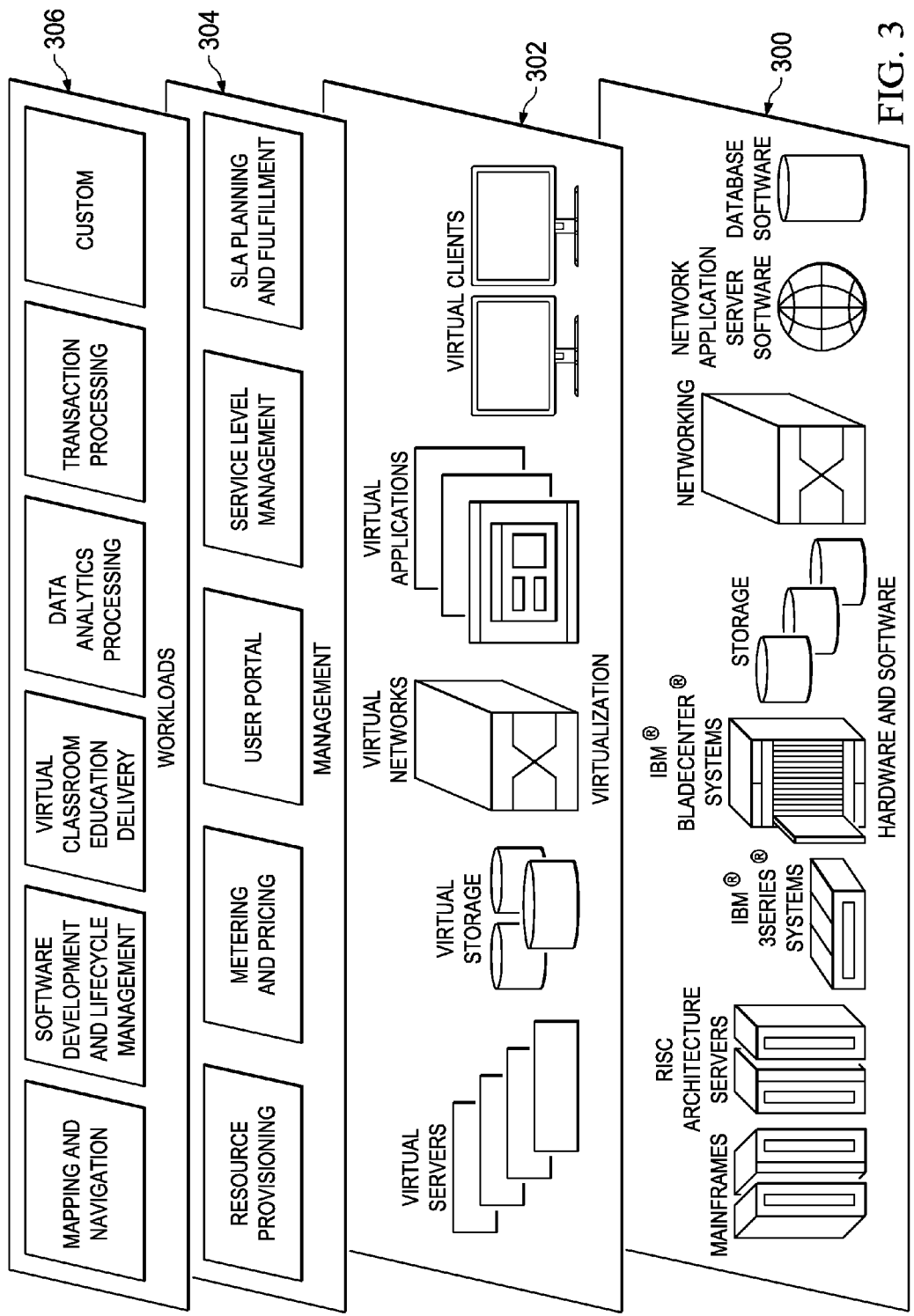
FIG. 3 depicts abstraction model layers of a cloud compute environment in which aspects of this disclosure may be implemented according to an embodiment of the invention.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide F-SSO to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute the target application 310 that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

A representative cloud-based client-server application is IBM® SmartCloud, which provides a cloud-delivered suite of technologies that combine web conferencing, messaging, and collaboration services with social networking capabilities in an easy-to-use web-based environment. Of course, the references herein to SmartCloud are merely for the sake of illustration, and they are not intended to limit the scope of this disclosure. SmartCloud is based in part on a rich client application known as Lotus Notes®, which provides email, calendaring, contact management, and instant messaging, although rich clients can be implemented in any client-server application. In this example, the server application is IBM Domino® data server.

Dynamically Selecting an Identity Provider Using a Knowledge Base

With the above as background, the subject matter of this disclosure is now described. As described above, in general this disclosure assumes that a service provider (SP) desires to use an external component (such as an IdP) to authenticate service users. In one embodiment, the service provider is a cloud provider, such as IBM SmartCloud, and the SP has associated therewith one or more SAML-based identity providers. According to this disclosure, a secure database is associated with the SP and maintains data that associates one or more attributes of a client request and the identity of an Identity Provider instance that has been used to handle that client request. This association is sometimes referred to herein as a request attribute-to-IdP instance mapping. Preferably, and as will be described in more detail below, a plurality of request attribute-to-IdP instance mappings (which, collectively, may be referred to herein as a "mapping" or "mappings") are derived by the service provider during normal IdP-initiated request flows. A normal IdP-initiated request flow is a flow that originates from an IdP and is directed to the SP in the usual course of an SSO (or federated SSO) client authentication. As noted above, this normal IdP-initiated data flow typically occurs when an end user web browser initiates a request to access a protected resource. According to this disclosure, as those normal IdP-initiated request flows pass through the service provider, the service provider builds a knowledge base of the request attribute-to-IdP associations. In this manner, the service provider "learns" the relationships between incoming requests and the appropriate IdP instances from which those requests were redirected. This knowledge base is then used by the service provider to dynamically select an IdP (or IdP instance) upon receipt at the SP of a new request that has been identified as originating from other than an IdP.

Figure 4:
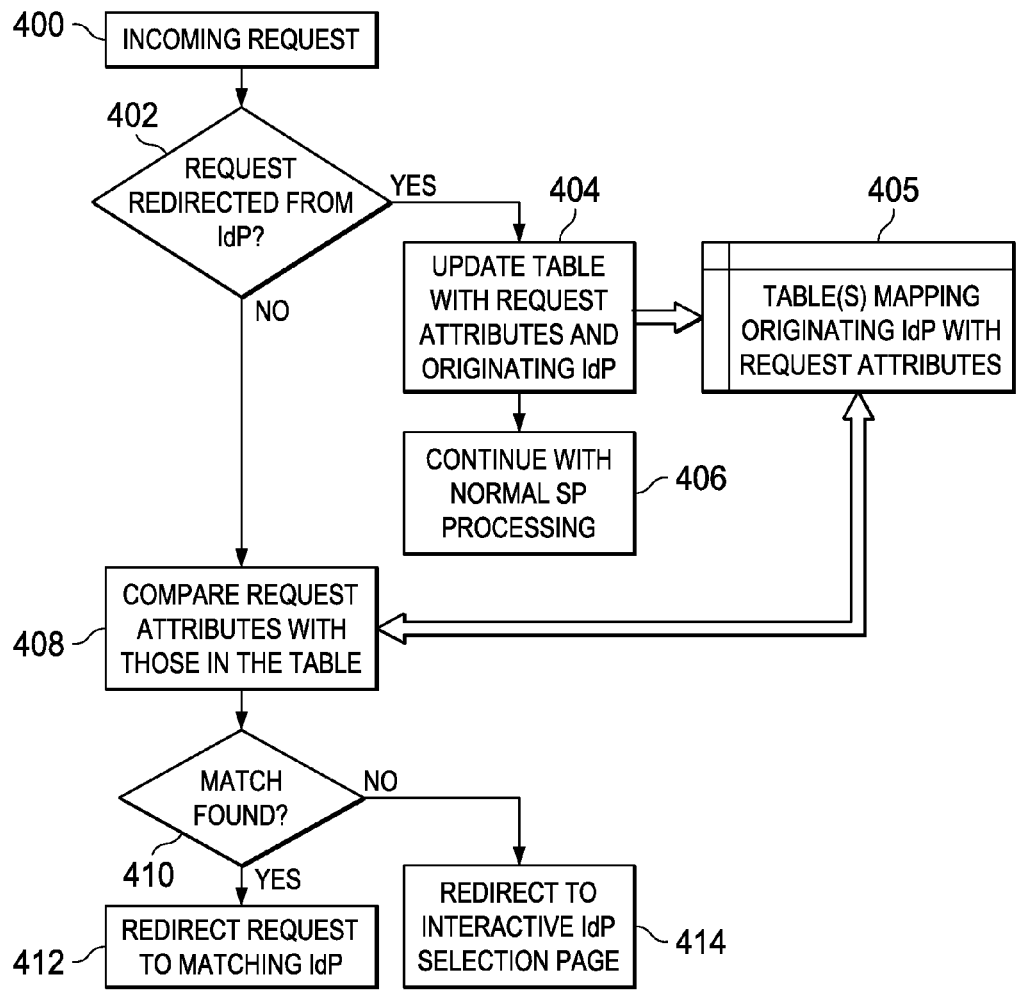
FIG. 4 illustrates how a user interacts with a service provider according to this disclosure.

FIG. 4 is a simplified description of the basic interaction, which as noted above is implemented at or in association with a service provider (SP).

At step 400, an incoming request is received at the service provider. Typically, the incoming request is generated as a result of an end user using a web browser and attempting to access a protected resource (e.g., a URL hosted on a Domino web server) but is not yet authenticated. As a result of this access request, the user is (or may have been) automatically redirected to the service provider (typically, via an SSO or federated SSO operation). At step 402, a test is performed to determine if the incoming request is one that has been redirected from an identity provider. In one embodiment, the test is performed by examining an HTTP header value (e.g., an HTTP Referrer header) and determining whether the value is recognized as an identity provider (or an IdP instance) that the SP has seen previously. As an alternative, the test at step 402 may determine that the incoming request is redirected from an identity provider by simply comparing an IP address associated with the request to a list of known IP addresses for the identity providers. Other known techniques also may be used (to determine whether the request has been redirected from an IdP). The IdP may be one for which a known association of request attributes (to that IdP) has been generated or otherwise maintained by the SP. If the outcome of the test at step 402 indicates that the incoming request is redirected from an IdP, then a normal IdP-initiated flow is indicated; as such, the routine continues at step 404 to update table 405 with information about (a) one or more request attributes of the request, and (b) an identifier associated with the originating IdP. As described above, table 405 associates the one or more request attributes with the originating IdP. Table 405 may comprise multiple tables. It represents an request attribute-to-IdP instance mapping. After updating the table 405, the routine continues at step 406 with normal service provider (SP) processing of the incoming request.

If, however, the outcome of the test at step 402 indicates that the request has not been redirected from a recognized IdP, then normal IdP-initiated data flow is not indicated. When this occurs, the service provider may perform an IdP discovery service using the mapping table 405 as follows. At step 408, the SP compares one or more request attributes (of the incoming request) with the corresponding attributes on the table (or tables) 405. At step 410, a test is performed to determine if a match between the one or more attributes of the incoming request and the corresponding attributes in the table 405 has been found. If the outcome of the test at step 410 indicates a match (within some configurable degree), the routine continues at step 412 to automatically redirect (e.g., via an HTTP 302) the incoming request to the IdP instance identified in the table (namely, the matching IdP). Although not shown in FIG. 4, upon redirection, the user is then authenticated at the identity provider (in the usual manner), following which the end user is redirected back to the SP to complete the SSO process. Access to the protected resource is then allowed.

If, however, the outcome of the test at step 410 fails to identify a matching IdP, the routine continues at step 414 to redirect the incoming request to an alternative IdP instance. In one embodiment, this alternative IdP is an IdP selection page (an interface) through which the end user can select an IdP. Another alternative is to "fail over" to another form of selection process, e.g., one based on geographic location, IdP instance load, or the like. Once again, whichever approach is used, the end user is then authenticated at the selected identity provider to complete the process.

The "match" criteria in step 410 may be varied. The criteria may require an exact match between each of one or more request attributes before the automatic redirection (in step 412) is initiated. In the alternative, some configurable degree of correlation may need to exist before the automatic redirection to a particular IdP is initiated. The degree to which the "match" must exist may also be varied depending on the age of the data in the table (i.e., the recency of that data). Other heuristics may also be applied to determine whether an acceptable match has been found in step 410.

Thus, the described approach enables the SP to "learn" what IdPs redirected requests to that SP and, in particular, to build-up knowledge about the relationship of the IdP that redirected the request and the initiator of the request (namely, the end user). Typically, and as noted above, the "knowledge" associates the identity of the IdP instance (which may be gleaned from the HTTP referrer field header) to one or more of the request attributes, such as client IP address, client DNS domain name, a domain associated with some other client identifier, such as an email address, a target URL of the incoming request (i.e., the target application for the request), and other HTTP header fields (e.g., as may be defined by an SP administrator). Any request attribute data that may be used to identify (or associate) the end user to the particular IdP instance that redirected the request thus may be maintained in the table or tables. This approach provides a simple but powerful technique for enabling a service provider to build a request attribute-to-IdP instance mapping table and to use that table to dynamically select an IdP without a priori configuration, static rules, or the like.

The approach described herein may be used in association with other SP-IdP processing including, without limitation, authenticating the user and returning a signed SAML assertion. As is well known, an assertion of this type typically includes, without limitation, the public key (or hash of the public key) belonging to the IdP and used to sign the assertion, a name of the IdP, a name of the user, an identifier (typically a URL) of a "service" to be accessed, one or more "not before" or "not after" timestamps, and the like. After receiving the assertion, the user connects to the SAML service provider service (e.g., a Domino web server configured as a SAML SP) and presents the assertion. A test is then performed at the SP to determine if the assertion is valid. If not, access to the resource is denied. If the assertion is valid, however, access is permitted provided the authenticated user is authorized to access the particular protected resource (e.g., as per the resource's access control list (ACL)). If the authenticated user is not authorized to access the protected resource (not illustrated), access is denied.

The service provider may operate a secure data store in which the request attribute-to-IdP instance mapping(s) are stored. The SP may enable other SPs or entities to share the mappings in the knowledge base, although typically a SP will have its own secure knowledge base that it builds in the manner described above with respect to FIG. 4. The secure data store may be implemented in Notes Storage Format (NSF), although this is not a limitation. Other types of data stores include, without limitation, relational databases, data arrays, linked lists, and the like.

The above-described technique provides numerous advantages, as have been described. The SP "learns" the relationship between incoming request(s) and the proper IdP instance to handle them. In this manner, the service provider builds up a knowledge base that is then leveraged to enable IdP discovery for new requests. If the table(s) that comprise the knowledge base have been built up sufficiently such that the request attributes closely correlate with particular IdP instances, the knowledge base may then be used as a "routing table" for identifying where subsequent HTTP requests (that have been redirected to the SP) should themselves be directed for handling. In particular, the approach enables the SP to figure out which IdP to route a particular incoming redirect request without requiring an administrator to configure and maintain large static rule set or other configuration parameters. As the SP continues to monitor the request attribute-to-IdP mappings, a more-refined mapping table is generated, thus further increasing the reliability and scalability of the solution.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The particular deployment scenario described above is not a limitation of this disclosure. The techniques described herein may be used in any deployment scenario (including, without limitation, for providing mobile access to web and other social network-based resources).

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As has been described, the scheme described herein may be implemented in or in conjunction with various server-side architectures other than cloud-based infrastructures. These include, without limitation, simple n-tier architectures, web portals, federated systems, and the like.

As the above examples illustrate, one or more of the service providers, the SAML assertion signature validation operation, and the catalog itself may be hosted within or external to the cloud.

Still more generally, the subject matter described herein can take the form of an entirely hardware embodiment, an entirely software embodiment or an embodiment containing both hardware and software elements. In a preferred embodiment, the layered logout function is implemented in software, which includes but is not limited to firmware, resident software, microcode, and the like. The data can be configured into a data structure (e.g., an array, a linked list, etc.) and stored in a data store, such as computer memory. Furthermore, as noted above, the functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the service provider components are implemented in a special purpose computer, preferably in software executed by one or more processors. The associated catalog configuration is stored in an associated data store. The software also is maintained in one or more data stores or memories associated with the one or more processors, and the software may be implemented as one or more computer programs.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, Firefox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

As used herein, a "service provider" or an "identity provider" may be a fully-featured or partially-featured provider.

Of course, the identification of any commercial product herein is not meant to be taken to limit the disclosed subject matter.

Having described our invention, what we now claim is as follows:

1. A method for enabling access to a protected resource in a federated distributed data processing environment, comprising:
    in association with a service provider, maintaining a data set that associates information identifying one or more identity providers with one or more request attributes, the service provider executing on a data processing machine having a hardware element;
    upon receipt by the service provider of a request to access the protected resource, determining whether the request originates from an identity provider;
    when the request does not originate from an identity provider, determining, using information in the data set, whether one or more attributes of the request are associated with a recognized identity provider as indicated in the data set; and
    when one or more of the attributes of the request are associated with a recognized identity provider, automatically redirecting the request to the recognized identity provider.

2. The method as described in claim 1 wherein, if the request originates from an identity provider, the data set is updated with information about one or more attributes of the request, and an identifier associated with the identity provider.

3. The method as described in claim 2 further including:
    processing the request without redirection to an identity provider.

4. The method as described in claim 1 wherein the one or more request attributes include one of: a client system IP address, a client DNS domain, a domain associated with a user identifier, a target URL for the request, and a value associated with header associated with the request.

5. The method as described in claim 1 wherein the step of determining whether the request originates from an identity provider examines a field of a request header.

6. The method as described in claim 1, further comprising:
    enabling access to the protected resource following receipt at the service provider of a redirection indicating that an end user has been authenticated at the recognized identity provider.

7. The method as described in claim 1, further including:
    when the request does not originate from an identity provider but one or more of the attributes of the request cannot be associated with a recognized identity provider, redirecting the request to an interface from which an identity provider selection is made.

8. Apparatus operating in a federated distributed data processing environment, comprising:
    a processor;
    a data store in which is maintained a data set that associates information identifying one or more identity providers with one or more request attributes; and
    computer memory holding computer program instructions that when executed by the processor perform a method for enabling access to a protected resource, the method comprising:
        upon receipt of a request to access the protected resource, determining whether the request originates from an identity provider;
        when the request does not originate from an identity provider, determining, using information in the data set, whether one or more attributes of the request are associated with a recognized identity provider as indicated in the data set; and
        when one or more of the attributes of the request are associated with a recognized identity provider, automatically redirecting the request to the recognized identity provider.

9. The apparatus as described in claim 8 wherein, if the request originates from an identity provider, the method further includes:
    updating the data set with information about one or more attributes of the request, and an identifier associated with the identity provider.

10. The apparatus as described in claim 9 wherein the method further includes:
    processing the request without redirection to an identity provider.

11. The apparatus as described in claim 8 wherein the one or more request attributes include one of: a client system IP address, a client DNS domain, a domain associated with a user identifier, a target URL for the request, and a value associated with header associated with the request.

12. The apparatus as described in claim 8 wherein the step of determining whether the request originates from an identity provider examines a field of a request header.

13. The apparatus as described in claim 8, wherein the method further includes:
enabling access to the protected resource following receipt at the service provider of a redirection indicating that an end user has been authenticated at the recognized identity provider.

14. The apparatus as described in claim 8, wherein the method further includes:
when the request does not originate from an identity provider but one or more of the attributes of the request cannot be associated with a recognized identity provider, redirecting the request to an interface from which an identity provider selection is made.

15. A computer program product in a non-transitory computer-readable storage medium for use in a data processing system for providing identity provider discovery services, the data processing system associated with a federated distributed data processing system, the computer program product holding computer program instructions which, when executed by the data processing system, perform a method for enabling access to a protected resource, the method comprising:
maintaining a data set that associates information identifying one or more identity providers with one or more request attributes;
upon receipt of a request to access the protected resource, determining whether the request originates from an identity provider;
when the request does not originate from an identity provider, determining, using information in the data set, whether one or more attributes of the request are associated with a recognized identity provider as indicated in the data set; and
when one or more of the attributes of the request are associated with a recognized identity provider, automatically redirecting the request to the recognized identity provider.

16. The computer program product as described in claim 15 wherein, if the request originates from an identity provider, the method further includes:
updating the data set with information about one or more attributes of the request, and an identifier associated with the identity provider.

17. The computer program product as described in claim 16 wherein the method further includes:
processing the request without redirection to an identity provider.

18. The computer program product as described in claim 15 wherein the one or more request attributes include one of: a client system IP address, a client DNS domain, a domain associated with a user identifier, a target URL for the request, and a value associated with header associated with the request.

19. The computer program product as described in claim 15 wherein the step of determining whether the request originates from an identity provider examines a field of a request header.

20. The computer program product as described in claim 15, wherein the method further includes:
enabling access to the protected resource following receipt at the service provider of a redirection indicating that an end user has been authenticated at the recognized identity provider.

21. The computer program product as described in claim 15, wherein the method further includes:
when the request does not originate from an identity provider but one or more of the attributes of the request cannot be associated with a recognized identity provider, redirecting the request to an interface from which an identity provider selection is made.

* * * * *